United States Patent
Bane

(10) Patent No.: US 11,231,315 B2
(45) Date of Patent: Jan. 25, 2022

(54) ACOUSTIC DETECTION OF POSITION OF A COMPONENT OF A FLUID CONTROL DEVICE

(71) Applicant: Darren Bane, Tomball, TX (US)

(72) Inventor: Darren Bane, Tomball, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 151 days.

(21) Appl. No.: 16/561,891

(22) Filed: Sep. 5, 2019

(65) Prior Publication Data
US 2021/0071517 A1    Mar. 11, 2021

(51) Int. Cl.
| | |
|---|---|
| *G01H 9/00* | (2006.01) |
| *E21B 47/095* | (2012.01) |
| *E21B 47/002* | (2012.01) |
| *E21B 47/135* | (2012.01) |
| *F16K 37/00* | (2006.01) |

(52) U.S. Cl.
CPC .......... *G01H 9/004* (2013.01); *E21B 47/002* (2020.05); *E21B 47/095* (2020.05); *E21B 47/135* (2020.05); *F16K 37/0058* (2013.01)

(58) Field of Classification Search
CPC .... F16K 37/0058; G01M 9/004; G01H 9/004; E21B 47/002; E21B 47/095; E21B 47/135
See application file for complete search history.

(56) References Cited

U.S. PATENT DOCUMENTS

| | | | | |
|---|---|---|---|---|
| 3,896,667 | A * | 7/1975 | Jeter | E21B 47/095 73/152.46 |
| 4,478,286 | A * | 10/1984 | Fineberg | E21B 34/101 166/324 |
| 5,029,597 | A * | 7/1991 | Leon | F16K 37/0083 137/1 |
| 5,083,452 | A * | 1/1992 | Hope | G01N 29/036 73/61.49 |
| 5,616,829 | A * | 4/1997 | Balaschak | F16K 31/046 137/551 |
| 6,281,489 | B1 | 8/2001 | Tubel et al. | |

(Continued)

OTHER PUBLICATIONS

Notification of Transmittal of the International Search Report and the Written Opinion of the International Searching Authority, or the Declaration; International filing date Aug. 21, 2020; dated Nov. 27, 2020; 16 pages.

*Primary Examiner* — John Fitzgerald
(74) *Attorney, Agent, or Firm* — Cantor Colburn LLP

(57) ABSTRACT

A system for estimating a position of a component of a fluid control device includes an optical fiber sensor having a section disposed at a fixed location relative to the fluid control device, the fluid control device configured to be disposed in a borehole in an earth formation and including a moveable member, the fixed location selected so that acoustic signals generated by fluid flowing through the fluid control device are receivable by the section of the optical fiber sensor. The system also includes an interrogation assembly configured to inject an optical signal into the optical fiber and receive a return signal, and a processing device configured to detect the return signal, identify a signal pattern based on the return signal, and estimate a position of the moveable member based on the identified signal pattern.

20 Claims, 4 Drawing Sheets

(56) References Cited

U.S. PATENT DOCUMENTS

| | | | |
|---|---|---|---|
| 7,557,339 B2 | 7/2009 | Poland et al. | |
| 8,020,616 B2* | 9/2011 | Greenaway | G01V 1/226 |
| | | | 166/254.2 |
| 8,471,551 B2 | 6/2013 | Lake et al. | |
| 8,902,078 B2* | 12/2014 | Vick, Jr. | E21B 34/14 |
| | | | 340/854.3 |
| 8,991,492 B2* | 3/2015 | Lovell | E21B 49/087 |
| | | | 166/250.17 |
| 9,200,508 B2* | 12/2015 | Duncan | E21B 47/135 |
| 10,246,991 B2* | 4/2019 | Longfield | E21B 47/095 |
| 10,365,136 B2* | 7/2019 | Jaaskelainen | E21B 34/06 |
| 10,370,959 B2* | 8/2019 | Jaaskelainen | E21B 47/107 |
| 10,392,882 B2* | 8/2019 | Dickenson | E21B 43/12 |
| 10,808,522 B2* | 10/2020 | Dickenson | E21B 47/107 |
| 11,036,242 B2* | 6/2021 | Hoke | F16K 37/005 |
| 2004/0084180 A1* | 5/2004 | Shah | E21B 47/10 |
| | | | 166/250.16 |
| 2004/0129424 A1* | 7/2004 | Hosie | E21B 47/10 |
| | | | 166/332.8 |
| 2006/0157240 A1 | 7/2006 | Shaw et al. | |
| 2009/0008078 A1* | 1/2009 | Patel | E21B 41/0035 |
| | | | 166/50 |
| 2011/0088462 A1* | 4/2011 | Samson | E21B 47/00 |
| | | | 73/152.18 |
| 2011/0188344 A1* | 8/2011 | Hartog | G01V 8/16 |
| | | | 367/27 |
| 2012/0046866 A1* | 2/2012 | Meyer | E21B 47/007 |
| | | | 702/6 |
| 2012/0146805 A1* | 6/2012 | Vick, Jr. | E21B 34/14 |
| | | | 340/853.2 |
| 2012/0152024 A1* | 6/2012 | Johansen | G01F 1/7086 |
| | | | 73/655 |
| 2012/0179378 A1* | 7/2012 | Duncan | E21B 47/135 |
| | | | 702/8 |
| 2013/0061688 A1* | 3/2013 | Hayward | G01D 5/35361 |
| | | | 73/861.27 |
| 2013/0091942 A1* | 4/2013 | Samson | G01H 9/004 |
| | | | 73/152.18 |
| 2013/0305825 A1* | 11/2013 | Comparetto | G01N 29/4427 |
| | | | 73/579 |
| 2014/0150548 A1* | 6/2014 | Childers | G01V 1/226 |
| | | | 73/152.54 |
| 2014/0286129 A1* | 9/2014 | Longfield | E21B 47/095 |
| | | | 367/33 |
| 2016/0251957 A1 | 9/2016 | McEwen-King et al. | |
| 2017/0075029 A1* | 3/2017 | Cuny | G01V 1/46 |
| 2017/0138179 A1* | 5/2017 | Jaaskelainen | E21B 47/113 |
| 2017/0167249 A1* | 6/2017 | Lee | E21B 47/135 |
| 2017/0175465 A1* | 6/2017 | Dickenson | E21B 47/113 |
| 2017/0191363 A1* | 7/2017 | Dickenson | E21B 47/135 |
| 2017/0205260 A1* | 7/2017 | Jaaskelainen | E21B 47/107 |
| 2017/0212272 A1* | 7/2017 | Monteiro | G01N 21/77 |
| 2017/0321484 A1* | 11/2017 | Dewald | E21B 3/02 |
| 2019/0063213 A1* | 2/2019 | Donderici | E21B 34/14 |
| 2019/0145544 A1* | 5/2019 | Carder | G01N 29/09 |
| | | | 137/551 |
| 2019/0242233 A1* | 8/2019 | Le Calvez | E21B 43/267 |
| 2020/0056722 A1* | 2/2020 | Eschenmoser | F16K 3/18 |
| 2020/0072995 A1* | 3/2020 | Milne | G01D 5/35316 |
| 2020/0256159 A1* | 8/2020 | Vick, Jr. | E21B 34/101 |
| 2021/0054709 A1* | 2/2021 | Hansen | E21B 43/119 |
| 2021/0131269 A1* | 5/2021 | Joseph | E21B 47/09 |

* cited by examiner

ACOUSTIC DETECTION OF POSITION OF A COMPONENT OF A FLUID CONTROL DEVICE

BACKGROUND

Exploration and production of hydrocarbons require a number of diverse activities from various engineering fields to be performed in a borehole penetrating an earth formation. Production generally involves activities such as drilling, installing permanent installations, casing perforation, hydraulic fracturing, formation evaluation, well integrity surveys, well stimulation, production logging, pressure pumping and cement evaluation.

There are a variety of tools and components that are deployed downhole to facilitate production. Such components can include safety valves, inflow control valves, production screens and inflow control devices. For example, subsurface safety valves (SSVs) may be deployed and activated to isolate a borehole (or section thereof) in the event of system failure or damage.

SUMMARY

An embodiment of a system for estimating a position of a component of a fluid control device includes an optical fiber sensor having a section disposed at a fixed location relative to the fluid control device, the fluid control device configured to be disposed in a borehole in an earth formation and including a moveable member, the fixed location selected so that acoustic signals generated by fluid flowing through the fluid control device are receivable by the section of the optical fiber sensor. The system also includes an interrogation assembly configured to inject an optical signal into the optical fiber and receive a return signal, and a processing device configured to detect the return signal, identify a signal pattern based on the return signal, and estimate a position of the moveable member based on the identified signal pattern.

An embodiment of a method of estimating a position of a component of a fluid flow control device includes injecting, by an interrogation assembly, an optical signal into an optical fiber sensor, a section of the optical fiber sensor disposed at a fixed location relative to a fluid control device disposed in a borehole in an earth formation and including a moveable member, the fixed location selected so that acoustic signals generated by fluid flowing through the flow control device are receivable by the section of the optical fiber sensor. The method also includes detecting a return signal including reflections of the optical signal from the section of the optical fiber sensor, identifying a signal pattern based on the return signal, and estimating a position of the moveable member based on the identified signal pattern.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Systems, devices and methods are provided herein for estimating the position of a moveable component of a fluid control device. An example of a fluid control device is a subsurface safety valve.

An embodiment of a position detection assembly and monitoring system includes a fiber optic sensor configured to detect acoustic signals due to fluid flow through the fluid control device. An interrogation assembly injects an optical signal into the fiber optic sensor, and detects a return signal reflected back to an optical sensor. The return signal is affected by the acoustic signals emitted by the fluid flow. The return signal is analyzed to identify a signal pattern (also referred to as a signature) and estimate a position of the valve member or other moveable component based on the identified signal pattern. In one embodiment, the position detection assembly compares the identified signal pattern with stored reference signal patterns associated with known positions.

In one embodiment, the fluid control device includes an actuator (e.g., a piston) configured to move the moveable component (e.g., the valve member), and the position detection assembly includes or is connected to a strain-based detection assembly configured to monitor the position of the actuator. The position detection assembly can utilize both the acoustic position detection assembly and the strain-based detection assembly to determine whether there is a mismatch between the moveable component and the actuator, which may be indicative of a malfunction, failure or other problem.

Embodiments described herein provide a number of advantages and technical effects. The position detection assembly, system and methods described herein provide for a relatively simple and cost-effective way to monitor safety valves and other downhole components. The position of a valve member or other moveable component can be estimated without relatively complex configurations, such as magnet sensors and discrete position sensors. For example, the position of a valve member of a safety valve can be effectively monitored without the need for sensing hardware such as magnets or other position detection devices mounted on a flow tube. In addition, embodiments described herein allow for the detection of any number of component positions, and allow for prompt detection of damage or malfunction.

Figure 1:
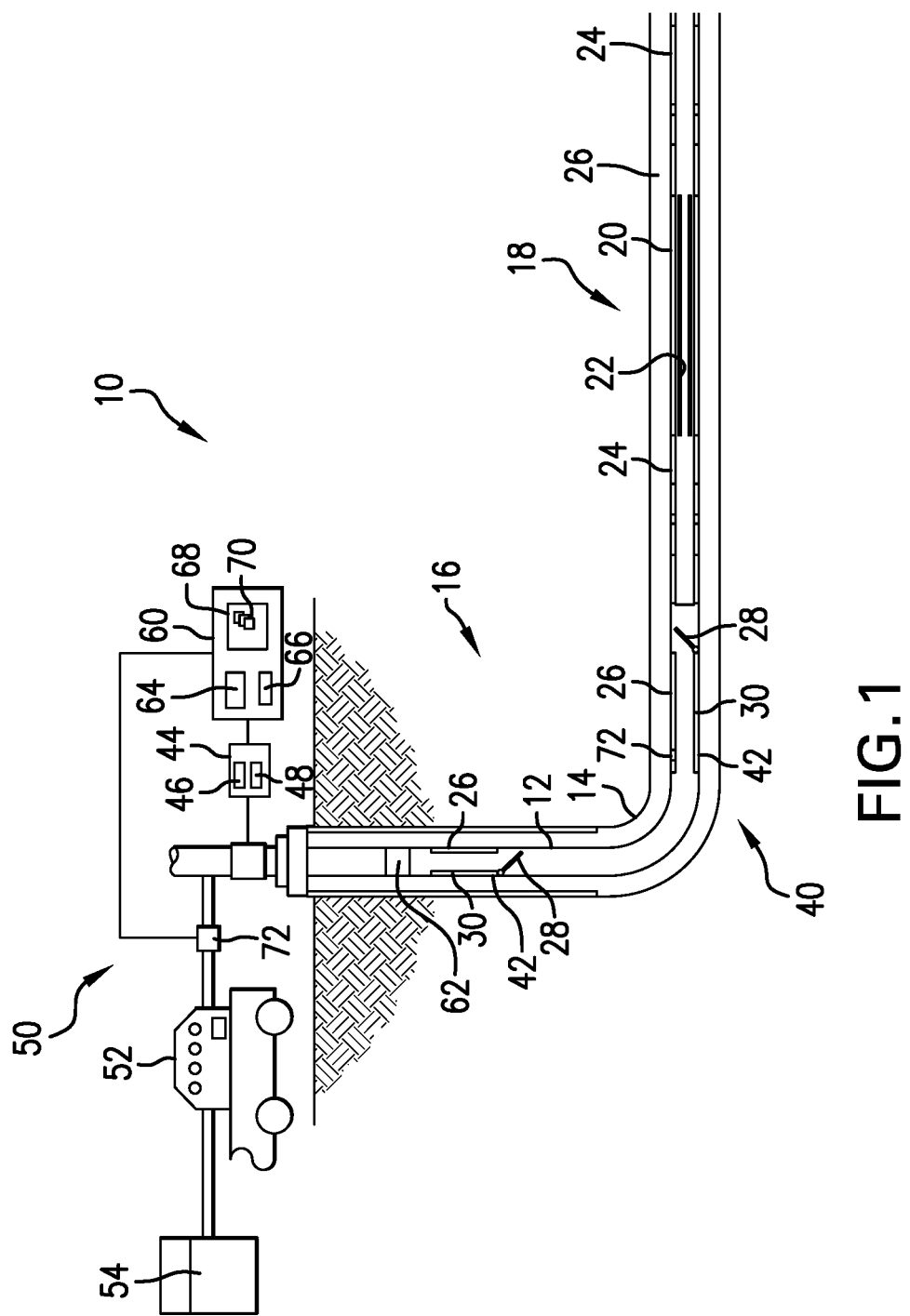
FIG. 1 illustrates an embodiment of a system for performing energy industry operations.

FIG. 1 illustrates an embodiment of a system 10 for performing energy industry operations. The system 10, in the embodiment of FIG. 1, is a completion and hydrocarbon production system 10. The system 10 is not so limited, and may be configured to perform any energy industry operation, such as a drilling, stimulation, measurement and/or production operation, or any other operation related to exploration and/or recovery of resources such as oil and gas.

A borehole string 12 including, e.g., a production string, is configured to be disposed in a borehole 14 that penetrates a resource bearing formation 16 or formation region. The borehole 14 may be an open hole, a cased hole or a partially cased hole. The borehole string 12 may be configured for various uses, such as drilling, completion, stimulation and others, and includes a tubular, such as a coiled tubing, pipe (e.g., multiple pipe segments) or wired pipe, that extends from a wellhead at a surface location (e.g., at a drill site or offshore stimulation vessel). As described herein, a "string" refers to any structure or carrier suitable for lowering a tool or other component through a borehole or connecting a drill bit to the surface, and is not limited to the structure and configuration described herein.

In one embodiment, the borehole string 12 includes a completion and production string configured to be deployed in the borehole 14 to install various components at selected locations to facilitate completion of the borehole 14 or sections thereof. For example, the borehole string 12 includes a completion string having a production assembly 18. The production assembly 18, in one embodiment, includes a screen assembly 20 such as a sand screen assembly or sub, and a production fluid flow control apparatus such as an inflow control device (ICD) 22. The borehole string 12 also includes one or more packer assemblies 24. The borehole string 12 and/or the production assembly 18 may include other components to facilitate production, such as an electric submersible pump (ESP), other artificial lift devices, a fracture or "frac" sleeve device and/or a perforation assembly.

The system 10 also includes one or more fluid control devices such as one or more subsurface safety valves (SSVs) 26, which can be operated from the surface or operated from the subsurface. Although fluid control devices are discussed as being configured as SSVs, they are not so limited and can be any suitable type of device or assembly that can control fluid flow. Examples of other fluid control devices include various valve devices, inflow control devices, sleeves, bypass subs and others.

Each SSV 26 includes a valve member 28 and a control member 30 that is axially moveable to control movement of the valve member 28 (e.g., a flapper) between various positions (e.g., an open position, a closed position and one or more intermediate positions). Axial movement as described herein refers to movement in a direction that is at least partially parallel or substantially parallel to a longitudinal axis of the SSV 26, the borehole string 12 and/or the borehole 14. It is noted that the control member 30 (or other actuator) may be moveable in other directions (e.g., transverse directions at least partially orthogonal to the longitudinal axis).

The valve member 28 may be controlled in any suitable manner. In one embodiment, each SSV 26 is hydraulically controlled.

The system 10 also includes a position detection assembly 40 configured to estimate a position of the valve member 28 based on detection of acoustic signals. In one embodiment, the position detection assembly 40 includes an optical fiber sensor 42 having one or more optical fibers. A section of the optical fiber sensor 42 is disposed proximate to the SSV 26 so that acoustic signals generated by fluid flowing through the SSV 26 impinge on the section of the optical fiber sensor 42 or are otherwise receivable by the section.

The optical fiber sensor 42, in one embodiment, is part of a distributed acoustic sensing (DAS) system. In DAS, spatial changes in optical signals scattered by an optical fiber are caused by the impingement of acoustic waves on the fiber and are detected by an interrogator capable of recognizing the changes based on scattered optical signals and deducing the acoustic signals.

An interrogator 44 is connected to the optical fiber sensor 42 and injects an optical signal into the optical fiber sensor 42. The interrogator 44 includes at least a light source 46 such as a laser, and a detector 48 for detecting a return signal including reflections in the optical fiber sensor 42. The interrogator 44 may be located, for example, at a surface location and/or a subsurface location (e.g., incorporated with the borehole string 12).

The system 10 also includes surface equipment 50 such as a drill rig, rotary table, top drive, blowout preventer and/or others to facilitate deploying the borehole string 12, operating various downhole components, monitoring fluid control devices and controlling fluid circulation through the borehole 14 and the borehole string 12. In one embodiment, the surface equipment 50 includes a fluid control system 52 including one or more pumps in fluid communication with a fluid tank 54 or other fluid source. The fluid control system 50 facilitates injection of fluids, such as drilling fluid (e.g., drilling mud), stimulation fluid (e.g., a hydraulic fracturing fluid), gravel slurries, proppant and others.

In one embodiment, the system 10 includes a processing device such as a surface processing unit 60, and/or a subsurface processing unit 62 disposed in the borehole 14 and connected to one or more downhole components. The processing device may be configured to perform functions such as controlling downhole components, transmitting and receiving data, processing measurement data and/or monitoring operations. In addition, the processing device may control aspects of fluid circulation, such as fluid pressure and/or flow rate in the borehole string 12.

The surface processing unit 60, in one embodiment, includes a processor 64, an input/output device 66 and a data storage device (or a computer-readable medium) 68 for storing data, files, models, data analysis modules and/or computer programs. For example, the storage device 68 stores processing modules 70 for performing functions such as controlling fluid circulation and downhole components, collecting data, communicating with downhole components, storing data, and/or performing data analysis. One or more processing modules 70 may be configured to perform aspects of methods described herein, including interrogating the fiber optic sensor 42, detecting and analyzing return signals, and estimating the position of a component of a fluid control device. One or more processing modules 70 may also be configured to perform various actions based on, e.g., estimating the component position, such as alerting an operator and/or controlling an operational parameter or parameters.

Various sensors and/or measurement tools may be included in the system 10 at surface and/or downhole locations. For example, one or more flow rate and/or pressure sensors 72 may be disposed in fluid communication with the flow control system 52 and the borehole string 12 for measurement of fluid characteristics. The sensors 72 may be positioned at any suitable location, such as proximate to or within a pump, at or near the surface, or at any other location along the borehole string 12 or the borehole 14. One or more pressure and/or flow rate sensors 72 may disposed downhole, e.g., to measure fluid flow rates through the SSV 26.

Figure 2:
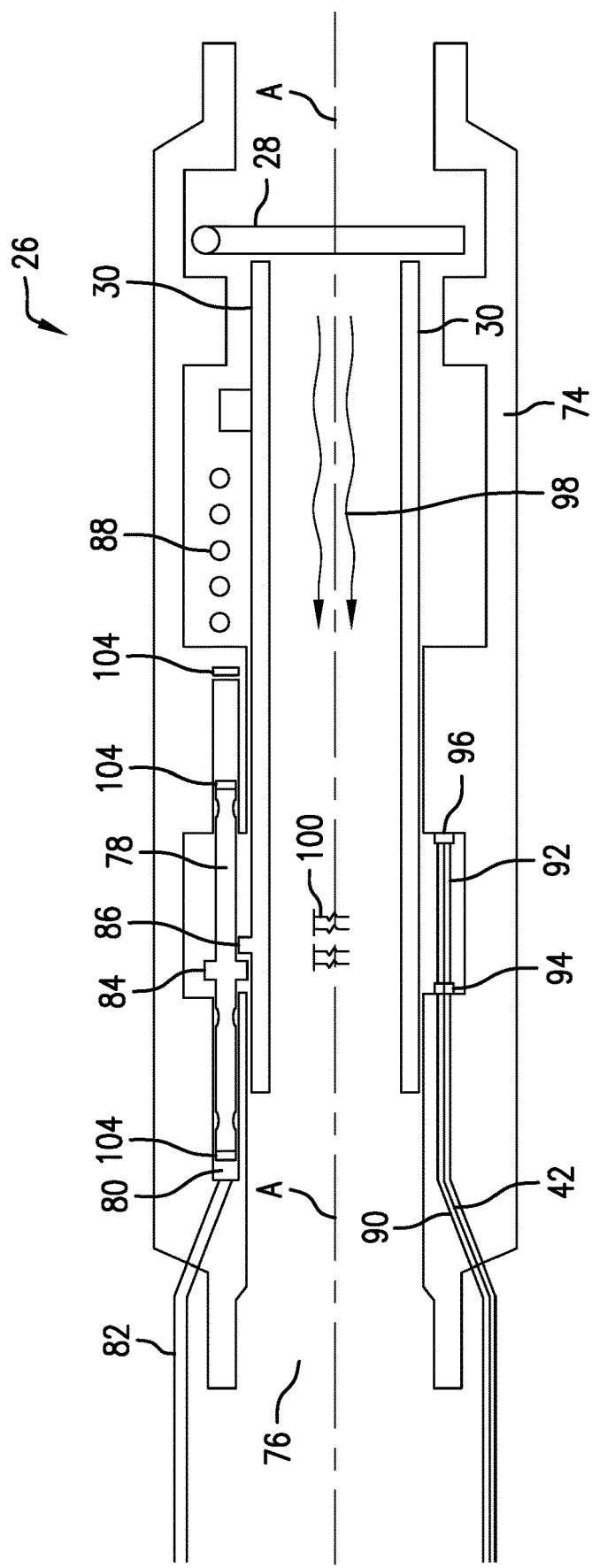
FIG. 2 depicts an embodiment of a fluid control device configured as a subsurface safety valve including a valve member in a first position.
Figure 3:
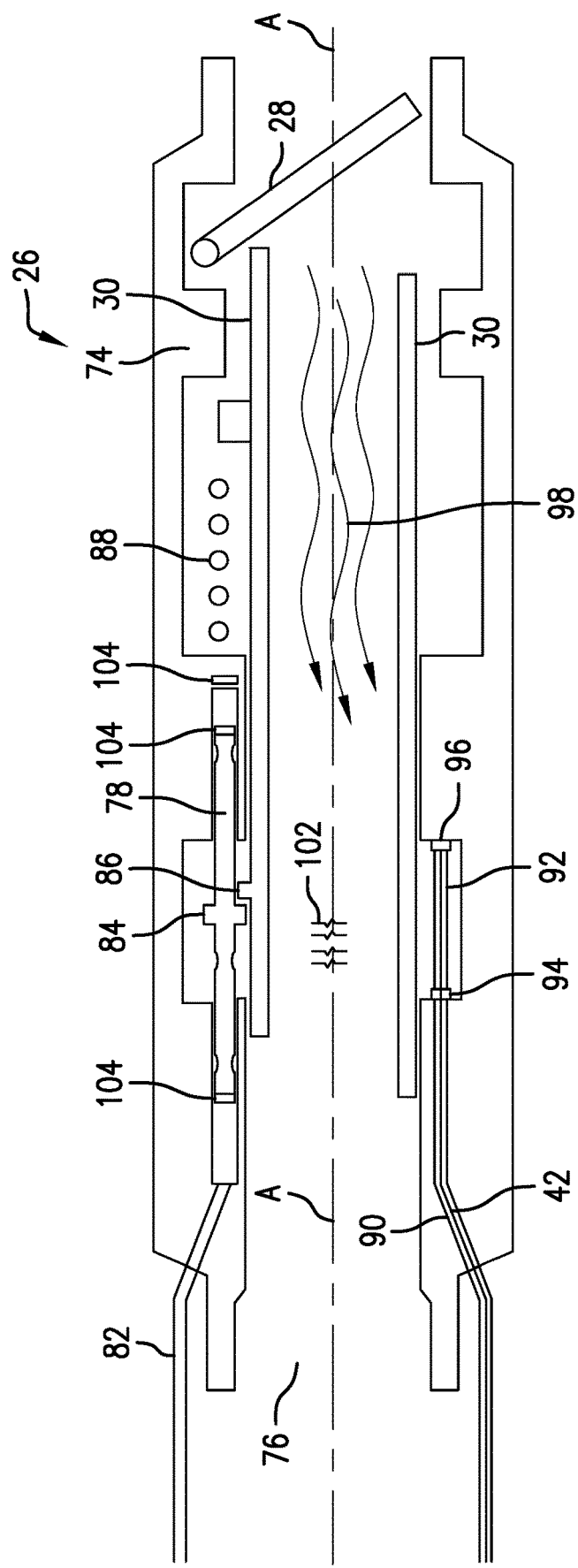
FIG. 3 depicts the fluid control device of FIG. 2 including the valve member in a second position.

FIGS. 2 and 3 depict an embodiment of the fluid control device configured as a subsurface safety valve (SSV). It is noted that although embodiments are described in conjunction with a safety valve, the embodiments may be utilized in conjunction with any suitable valve or flow control device having a moveable actuator or member. Examples include inflow control devices (ICD), sliding sleeves, perforation assemblies, hydraulic fracturing control devices (e.g., frac sleeves), and others.

FIG. 2 depicts the SSV 26 in a first position. The first position is a partially open position (e.g., 10% open), in which the valve member 28 is slightly open and permits some fluid flow. FIG. 3 depicts the SSV 26 in an intermediate position in which the valve member 28 is partially open. The SSV 26 may be operable to move between various positions in addition to the valve member positions of FIGS. 2 and 3, such as a fully open position, and various partially open positions that can permit various levels of fluid flow therethrough. The valve member 28 may be a flapper valve or have any suitable configuration.

Referring to FIGS. 2 and 3, the SSV 26 includes or is disposed in a tubular housing 74 that defines a central fluid conduit 76. The central fluid conduit 76 is in fluid communication with other components of the borehole string 12 to allow circulation of fluid through the borehole string 12. The housing 74 may be a section of drill pipe, a sub or other component. The control member 30 in the embodiment of FIGS. 2 and 3 is configured as a flow tube and is referred to hereinafter as a flow tube 30. The flow tube 30 is a cylindrical tubular member that permits fluid flow through the central fluid conduit 76 and is moveable axially along the housing 74, e.g., at least substantially parallel to a longitudinal axis A of the housing 74.

The SSV 26 also includes an actuator piston 78 that is disposed in a piston chamber 80. The piston chamber 80 can be a cavity in the wall of the housing 74 or attached to the housing 74. The actuator piston 78 is moveable in an axial direction to move the flow tube 30 between various positions.

In one embodiment, the actuator piston 78 is hydraulically controlled. For example, the piston chamber 80 is in fluid communication with a hydraulic control line 82. Pressure in the control line 82 can be controlled to move the actuator piston 78 in an axial direction and maintain the actuator position 78 at a selected axial position.

The actuator piston 78 can be operably connected to the flow tube 30 in any suitable manner, such that movement of the actuator piston 78 in at least one direction causes a corresponding movement of the flow tube 30. For example, the actuator piston 78 includes a protrusion 84 or other feature configured to engage a corresponding protrusion 86 or other engagement feature of the flow tube 30. Movement of the actuator piston 78 in a direction toward the valve member 28 causes the piston protrusion 84 to engage the flow tube protrusion 86 to push the flow tube 30 in the direction.

For example, during a downhole operation, the SSV 26 is maintained in an open position. A sufficient pressure is maintained in the hydraulic control line 82 so that the actuator piston 78 maintains the flow tube 30 in a position so that the valve member 28 is open. The pressure is at least high enough to overcome the biasing force of a biasing member such as a spring 88. In the event of a power failure, equipment failure or other problem, pressure in the hydraulic flow line 82 can be released, and the spring 88 urges the flow tube 30 in a direction away from the valve member. At this point, the valve member 28 is urged into the closed position, which completely or substantially cuts off back-pressure and prevents fluid flow through the SSV 26. To open the valve member 28 to an open or intermediate position, pressure in the hydraulic flow line is increased to move the actuator piston 78 axially, and exert an axial force to move the flow tube 30 and open the valve member 28.

The position detection assembly includes an optical fiber sensor 42 that is operably connected to the SSV 26 via, for example, a conduit 90 in the housing 74. A section 92 of the optical fiber sensor 42 is positioned so that acoustic signals emitted by fluid flowing through the fluid conduit 76 impinge on the section 92. For example, the section 92 of the optical fiber sensor 42 is suspended between attachments 94 and 96, so that acoustic signals vibrate the section 92 and affect optical signals reflected therein.

In one embodiment, the interrogator 44 and the optical fiber sensor 42 are configured as an acoustic sensing (DAS) system. In this embodiment, the interrogator 44 is configured to emit coherent signal pulses (e.g., laser pulses) and measure reflected signals based on Rayleigh scattering from scattering locations in the section 92 of the optical fiber sensor.

The position detection assembly 40 is configured to detect return signals and analyze the return signals to identify a signal pattern associated with acoustic signals generated by fluid flow. The position of the valve member 28 affects the nature of the multiphase fluid flow through the safety valve 30, causing the fluid to follow a different flow path. As a result, fluid flow associated with each position results in a different acoustic signal.

For example, in the position shown in FIG. 2, fluid flow of fluid 98 generates a first acoustic signal 100 that impinges on the section 92. Reflected optical signals detected as a return signal have an identifiable signal pattern corresponding to the first acoustic signal 100. In the intermediate position shown in FIG. 3, flow of the fluid 98 generates a second acoustic signal 102 that results in a different identifiable signal pattern. Each signal pattern can be considered a signature that is uniquely associated with a given valve member position (for a given set of fluid flow conditions).

Accordingly, a set of reference signal patterns can be generated for each of a plurality of positions, including a closed position, an open (fully open) position, and one or more intermediate positions such as those shown in FIGS. 2 and 3. In some instances, the closed position results in a lack of fluid flow, which would produce little or no acoustic signal. A reference pattern for a closed position in such instances may be no signal or a signal pattern having values below a minimum threshold In one embodiment, the position detection assembly 40 is configured to store and/or access information that associates various signal patterns (reference signal patterns) with corresponding valve member positions. The reference signal patterns can be generated by measuring acoustic signals emitted when the SSV 26 is in various known positions.

For example, a lookup table (LUT) or other suitable data structure is stored in the data storage device 68 (or in any other suitable location) that relates each valve member position with a reference signal pattern. As acoustic emissions change with different flow rates and fluid properties, the LUT can store a set of reference signal patterns for a given set of fluid flow conditions. Examples of fluid flow conditions include flow rate, pressure and fluid compositions. The reference signal patterns can also be associated with other conditions, such as temperature.

In one embodiment, the position detection assembly 40 includes or is connected to a strain-based position detection system that includes one or more strain sensors 104. The strain sensors can be wire sensors or other sensors such as Wheatstone bridge sensors.

The strain sensors 104 may be positioned at or near the end(s) of the actuator piston, so that contact between the end and a surface of the piston chamber 80 (or positioning of the end near the surface) causes deformation of a strain sensor 104. Strain sensors 104 can be positioned at other locations, such as at or near the piston protrusion 84.

The strain sensors 104 are connected to the surface processing unit 60 or another suitable processing device. The processing device detects electrical signals from the strain sensors and can estimate an axial position of the actuator piston 78. As discussed below, the strain-based position detection system and the optical fiber sensor 42 can be utilized in combination, for example, to detect a malfunction or failure.

Figure 4:
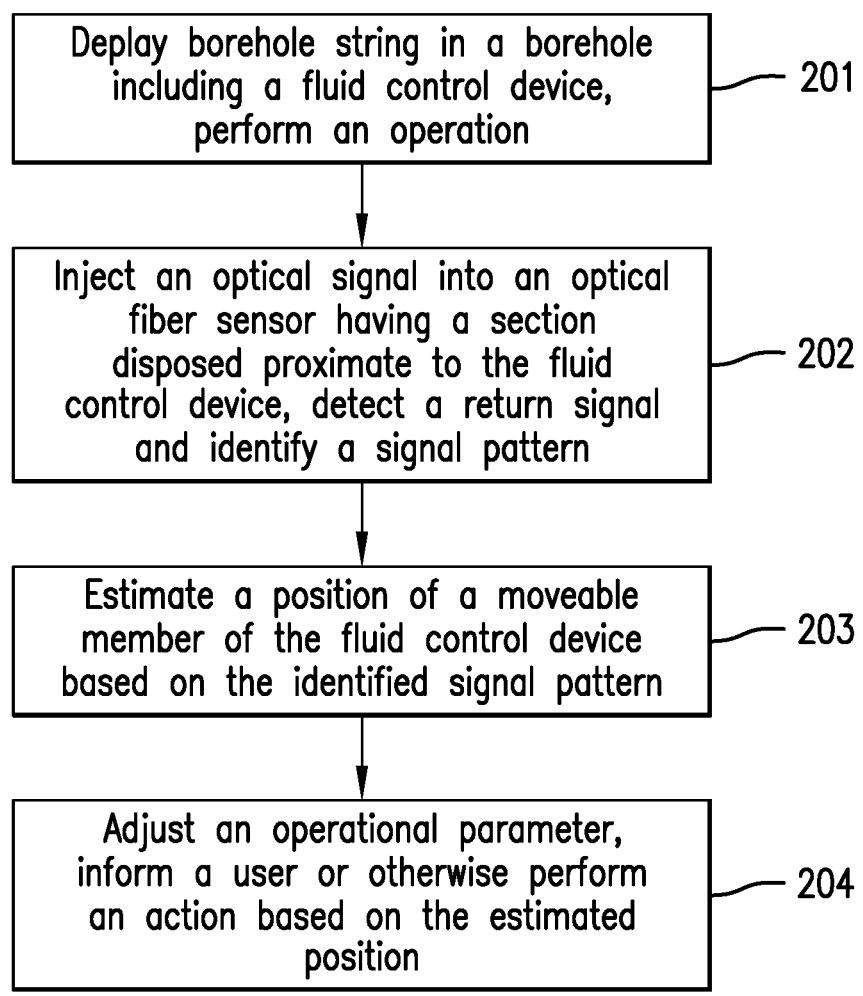
FIG. 4 is a flow chart depicting an embodiment of a method of controlling fluid flow and/or monitoring a position of a component of a fluid control device.

FIG. 4 is a flow chart that illustrates an embodiment of a method 200 of estimating a position of a component of a fluid control device and/or controlling aspects of an energy industry operation. Aspects of the method 200, or functions or operations performed in conjunction with the method, may be performed by one or more processing devices, such as the surface processing unit 60, either alone or in conjunction with a human operator. The method 200 is discussed in conjunction with the system 10 of FIG. 1, and with the SSV 26 of FIGS. 2 and 3, but is not so limited.

The method 200 includes one or more stages 201-204. In one embodiment, the method 200 includes the execution of all of the stages 201-204 in the order described. However, certain stages may be omitted, stages may be added, or the order of the stages changed.

In the first stage 201, an energy industry operation is performed, such as a production operation or other operation related to exploration and production of hydrocarbons. For example, the borehole string 12 is deployed into the borehole 14 and advanced to a selected depth or location along the borehole 14. Various operations may be performed prior to commencing production, such a completion and/or stimulation operations (e.g., perforation and/or hydraulic fracturing).

The borehole string 12 includes one or more fluid control devices such as a SSV 26. During at least part of the operation, the SSV 26 is maintained in an open position to allow fluid to flow unobstructed through the borehole string 12.

In the second stage 202, an optical signal is injected into the optical fiber sensor 42, and reflections and backscatter are returned to the interrogator 44 and detected by the detector 48 as a return signal. The return signal is sampled and digitized, and processed to identify a signal pattern.

In the third stage 203, the processing device estimates a position of a moveable member of the SSV 26, such as the flow tube 30. In one embodiment, the processing device associates the identified signal pattern with a corresponding valve member position. For example, the processing device consults one or more lookup tables (LUTs) and compares the identified signal pattern with stored reference signal patterns. If the identified signal pattern matches or has sufficient similarity to a reference signal pattern, the processing device determines that the valve member 28 is in a position associated with the reference signal pattern.

In one embodiment, the stored reference signal patterns are pre-determined patterns derived by calibrating the position detection system 40. For example, the SSV 26 is operated under known conditions (e.g., known flow rate, pressure, fluid composition and others) during a calibration process, and the optical fiber sensor 42 is interrogated when the valve member 28 is in a selected position. For example, reference signal patterns are generated (for a given set of fluid flow conditions) for a fully open position and for partially open (intermediate) positions, such as 25%, 50% and 75% open positions.

The calibration may be performed for any number of different sets of fluid flow conditions, so that reference signal patterns are produced for each valve member position. For example, multiple LUTs are stored. Each LUT is associated with a respective set of fluid flow conditions, and includes reference signal patterns for the fully open position and each partially open position.

In the fourth stage 204, various actions are performed based on the estimated position of the valve member 28. For example, an estimated position or positions can be displayed to an operator or other user to allow for monitoring of the SSV 26. Other actions can include controlling or adjusting operational parameters such as fluid flow rate and/or pressure.

In one embodiment, the position detection assembly 40 includes the strain-based position detection system, and the method 200 includes detecting a position of the actuator piston 78. For example, the processing device monitors strain sensors 104 at one or more locations, and identifies a piston position therefrom. For example, if the actuator piston 78 is at a position associated with a fully open position, a strain sensor 104 detects contact between an end of the actuator piston 78 and a surface of the piston chamber 80.

The piston position, under normal operation, correlates with a specific valve member position. The processing device estimates a position of the valve member 28 using acoustic detection and estimates a position of the actuator piston 78 using strain-based measurements. The position of the actuator piston 78 is associated with a valve member position. If the positions (i.e., the estimated position using acoustic detection and the associated position based on strain measurement) do not match, the processing device can determine that there is a malfunction or damage (e.g., the flow tube 30 is stuck in a position or the valve member 28 is leaking). The processing device can perform various actions in response, such as alerting an operator, or shutting down or otherwise controlling operational parameters.

Set forth below are some embodiments of the foregoing disclosure:

Embodiment 1: A system for estimating a position of a component of a fluid control device, comprising: an optical fiber sensor having a section disposed at a fixed location relative to the fluid control device, the fluid control device configured to be disposed in a borehole in an earth formation and including a moveable member, the fixed location selected so that acoustic signals generated by fluid flowing through the fluid control device are receivable by the section of the optical fiber sensor; an interrogation assembly configured to inject an optical signal into the optical fiber and receive a return signal; and a processing device configured to perform: detecting the return signal, and identifying a signal pattern based on the return signal; and estimating a position of the moveable member based on the identified signal pattern.

Embodiment 2: The system of any prior embodiment, wherein the fluid control device is a subsurface safety valve, and the moveable member is a flapper valve actuatable by a flow tube.

Embodiment 3: The system of any prior embodiment, wherein estimating the position includes comparing the identified signal pattern to a plurality of reference signal patterns, each reference signal pattern representing a respective position of the moveable member.

Embodiment 4: The system of any prior embodiment, wherein the moveable member is a valve member operable to control fluid flow through the fluid control device, and the plurality of reference signal patterns include a reference signal pattern associated with each of an open position, a closed position and at least one intermediate position of the valve member.

Embodiment 5: The system of any prior embodiment, wherein the plurality of reference signal patterns are stored in a data structure accessible by the processing device, each reference signal pattern related to a position of the moveable member for a selected set of fluid flow properties.

Embodiment 6: The system of any prior embodiment, wherein the data structure includes a look-up table, the look-up table storing a set of reference signal patterns related to the selected set of fluid flow properties, the set of reference signal patterns corresponding to a plurality of positions of the moveable member.

Embodiment 7: The system of any prior embodiment, wherein the moveable member includes a valve member connected to an actuator, the actuator configured to be moved between a plurality of actuator positions.

Embodiment 8: The system of any prior embodiment, further comprising a position sensor disposed at the fluid control device, the processing device configured to detect a position of the actuator.

Embodiment 9: The system of any prior embodiment, wherein the position sensor includes a strain sensor disposed at or near the actuator.

Embodiment 10: The system of any prior embodiment, wherein the processing device is configured to perform at least one of: associating the detected position of the actuator with a position of the valve member; comparing the associated position of the valve member with the estimated position; and determining that the fluid control device is functioning properly based on the associated position being at least substantially the same as the estimated position, and determining that the fluid control device is malfunctioning based on the associated position being different than the estimated position.

Embodiment 11: A method of estimating a position of a component of a fluid flow control device, comprising: injecting, by an interrogation assembly, an optical signal into an optical fiber sensor, a section of the optical fiber sensor disposed at a fixed location relative to a fluid control device disposed in a borehole in an earth formation and including a moveable member, the fixed location selected so that acoustic signals generated by fluid flowing through the flow control device are receivable by the section of the optical fiber sensor; detecting a return signal including reflections of the optical signal from the section of the optical fiber sensor; identifying a signal pattern based on the return signal; and estimating a position of the moveable member based on the identified signal pattern.

Embodiment 12: The method of any prior embodiment, wherein the fluid control device is a subsurface safety valve, and the moveable member is a flapper valve actuatable by a flow tube.

Embodiment 13: The method of any prior embodiment, wherein estimating the position includes comparing the identified signal pattern to a plurality of reference signal patterns, each reference signal pattern representing a respective position of the moveable member.

Embodiment 14: The method of any prior embodiment, wherein the moveable member is a valve member operable to control fluid flow through the fluid control device, and the plurality of reference signal patterns include a reference signal pattern associated with each of an open position, a closed position and at least one intermediate position of the valve member.

Embodiment 15: The method of any prior embodiment, wherein the plurality of reference acoustic signal patterns are stored in a data structure accessible by the processing device, each reference signal pattern related to a position of the moveable member for a selected set of fluid flow properties.

Embodiment 16: The method of any prior embodiment, wherein the data structure includes a look-up table, the look-up table storing a set of reference signal patterns related to the selected set of fluid flow properties, the set of reference signal patterns corresponding to a plurality of positions of the moveable member.

Embodiment 17: The method of any prior embodiment, wherein the moveable member includes a valve member connected to an actuator, the actuator configured to be moved between a plurality of actuator positions.

Embodiment 18: The method of any prior embodiment, further comprising detecting a position of the actuator by a position sensor disposed at the fluid control device.

Embodiment 19: The method of any prior embodiment, wherein the position sensor includes a strain sensor disposed at or near the actuator.

Embodiment 20: The method of any prior embodiment, further comprising performing at least one of: associating the detected position of the actuator with a position of the valve member; comparing the associated position of the valve member with the estimated position; and determining that the fluid control device is functioning properly based on the associated position being at least substantially the same as the estimated position, and determining that the fluid control device is malfunctioning based on the associated position being different than the estimated position.

In support of the teachings herein, various analysis components may be used, including a digital and/or an analog system. For example, embodiments such as the system 10, downhole tools, hosts and network devices described herein may include digital and/or analog systems. Embodiments may have components such as a processor, storage media, memory, input, output, wired communications link, user interfaces, software programs, signal processors (digital or analog), signal amplifiers, signal attenuators, signal converters and other such components (such as resistors, capacitors, inductors and others) to provide for operation and analyses of the apparatus and methods disclosed herein in any of several manners well-appreciated in the art. It is considered that these teachings may be implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for estimating a position of a component of a fluid control device, comprising:
   an optical fiber sensor having a section disposed at a fixed location relative to the fluid control device, the fluid control device configured to be disposed in a borehole in an earth formation and including a moveable member connected to an actuator, the fixed location selected so that acoustic signals generated by fluid flowing through the fluid control device are receivable by the section of the optical fiber sensor;
   an interrogation assembly configured to inject an optical signal into the optical fiber and receive a return signal;
   a position sensor disposed at the fluid control device, the position sensor configured to detect a position of the actuator; and
   a processing device configured to perform:
      associating the detected position of the actuator with an associated position of the moveable member;
      detecting the return signal, and identifying a signal pattern based on the return signal; and
      estimating a position of the moveable member based on the identified signal pattern; and
      comparing the associated position of the moveable member with the estimated position of the moveable member.

2. The system of claim 1, wherein the fluid control device is a subsurface safety valve, and the moveable member is a flapper valve actuatable by a flow tube.

3. The system of claim 1, wherein the moveable member includes a valve member connected to an actuator, the actuator configured to be moved between a plurality of actuator positions.

4. The system of claim 1, wherein the processing device is further configured to perform determining whether the fluid control device is functioning properly based on the comparing.

5. The system of claim 1, wherein the position sensor includes a strain sensor disposed at a selected location relative to the actuator.

6. The system of claim 1, wherein the processing device is further configured to perform:
   determining that the fluid control device is functioning properly based on the associated position being at least substantially the same as the estimated position, and determining that the fluid control device is malfunctioning based on the associated position being different than the estimated position.

7. The system of claim 1, wherein estimating the position includes comparing the identified signal pattern to a plurality of reference signal patterns, each reference signal pattern representing a respective position of the moveable member.

8. The system of claim 7, wherein the moveable member is a valve member operable to control fluid flow through the fluid control device, and the plurality of reference signal patterns include a reference signal pattern associated with each of an open position, a closed position and at least one intermediate position of the valve member.

9. The system of claim 7, wherein the plurality of reference signal patterns are stored in a data structure accessible by the processing device, each reference signal pattern related to a position of the moveable member for a selected set of fluid flow properties.

10. The system of claim 9, wherein the data structure includes a look-up table, the look-up table storing a set of reference signal patterns related to the selected set of fluid flow properties, the set of reference signal patterns corresponding to a plurality of positions of the moveable member.

11. A method of estimating a position of a component of a fluid flow control device, comprising:
    injecting, by an interrogation assembly, an optical signal into an optical fiber sensor, a section of the optical fiber sensor disposed at a fixed location relative to a fluid control device disposed in a borehole in an earth formation and including a moveable member connected to an actuator, the fixed location selected so that acoustic signals generated by fluid flowing through the flow control device are receivable by the section of the optical fiber sensor;
    detecting a position of the actuator by a position sensor disposed at the fluid control device;
    associating the detected position of the actuator with an associated position of the moveable member;
    detecting a return signal including reflections of the optical signal from the section of the optical fiber sensor;
    identifying a signal pattern based on the return signal;
    estimating a position of the moveable member based on the identified signal pattern; and
    comparing the associated position of the moveable member with the estimated position of the moveable member.

12. The method of claim 11, wherein the fluid control device is a subsurface safety valve, and the moveable member is a flapper valve actuatable by a flow tube.

13. The method of claim 11, wherein the moveable member includes a valve member connected to an actuator, the actuator configured to be moved between a plurality of actuator positions.

14. The method of claim 11, further comprising determining whether the fluid control device is functioning properly based on the comparing.

15. The method of claim 11, wherein the position sensor includes a strain sensor disposed at a selected location relative to the actuator.

16. The method of claim 11, further comprising:
    determining that the fluid control device is functioning properly based on the associated position being at least substantially the same as the estimated position, and determining that the fluid control device is malfunctioning based on the associated position being different than the estimated position.

17. The method of claim 11, wherein estimating the position includes comparing the identified signal pattern to a plurality of reference signal patterns, each reference signal pattern representing a respective position of the moveable member.

18. The method of claim 17, wherein the moveable member is a valve member operable to control fluid flow through the fluid control device, and the plurality of reference signal patterns include a reference signal pattern associated with each of an open position, a closed position and at least one intermediate position of the valve member.

19. The method of claim 17, wherein the plurality of reference acoustic signal patterns are stored in a data structure accessible by the processing device, each reference signal pattern related to a position of the moveable member for a selected set of fluid flow properties.

20. The method of claim 19, wherein the data structure includes a look-up table, the look-up table storing a set of reference signal patterns related to the selected set of fluid flow properties, the set of reference signal patterns corresponding to a plurality of positions of the moveable member.

* * * * *